United States Patent [19]

Holmes

[11] Patent Number: 4,812,682

[45] Date of Patent: Mar. 14, 1989

[54] SIMULTANEOUS ALL-OPTICAL LOGICAL OPERATIONS USING THE THIRD ORDER NONLINEAR OPTICAL EFFECT AND A SINGLE WAVEGUIDE

[76] Inventor: Richard B. Holmes, 260 Tremont St., Apt. #7, Melrose, Mass. 02176

[21] Appl. No.: 171,322

[22] Filed: Mar. 21, 1988

[51] Int. Cl.$^4$ .............................................. H03F 7/00
[52] U.S. Cl. .................................... 307/425; 307/426; 372/21; 372/9; 372/28
[58] Field of Search .................. 307/425, 426; 372/21, 372/33, 9, 28

[56] References Cited

U.S. PATENT DOCUMENTS

| | | |
|---|---|---|
| 4,005,935 | 2/1977 | Wang . |
| 4,220,928 | 9/1980 | Bloom et al. . |
| 4,233,571 | 11/1980 | Wang et al. . |
| 4,306,195 | 12/1981 | Stappaerts . |
| 4,321,550 | 3/1982 | Evtuhov . |
| 4,344,042 | 8/1982 | Hon . |
| 4,389,617 | 6/1983 | Kurnit . |
| 4,500,855 | 2/1985 | Feinberg . |
| 4,769,820 | 9/1988 | Holmes ................................ 372/33 |

OTHER PUBLICATIONS

"Connection Between the Wave Fronts of the Reflecting & Exciting Light in Stimulated Mandel Shtam-Brillouin Scattering", B. Ya. Zeldovich et al, JETP Lett. 15, 109 (1972).

"Coherently Driven Molecular Vibrations & Light Modulation" E. Garmire et al, Phys. Rev. Lett. 11, 160 (1963).

"Image Phase Compensation & Real-Time Holography by Four-Wave Mixing in Optical Fibres" A. Yariv et al, Appl. Phys. Lett. 32, 635 (1978).

Primary Examiner—Leon Scott, Jr.
Attorney, Agent, or Firm—Wolf, Greenfield & Sacks

[57] ABSTRACT

Spatial modulation representing digital information is imposed on a pump laser beam, and differing modulation representing different digital information is imposed on a second light beam which has a frequency equal to the pump beam less the nonlinear optical Stokes frequency shift. All the digital information on the two beams is logically combined simultaneously in a single waveguide containing the corresponding nonlinear optical (e.g. Brillouin) material with the result of the logical operations recorded on the wavefront of the second light beam.

19 Claims, 1 Drawing Sheet

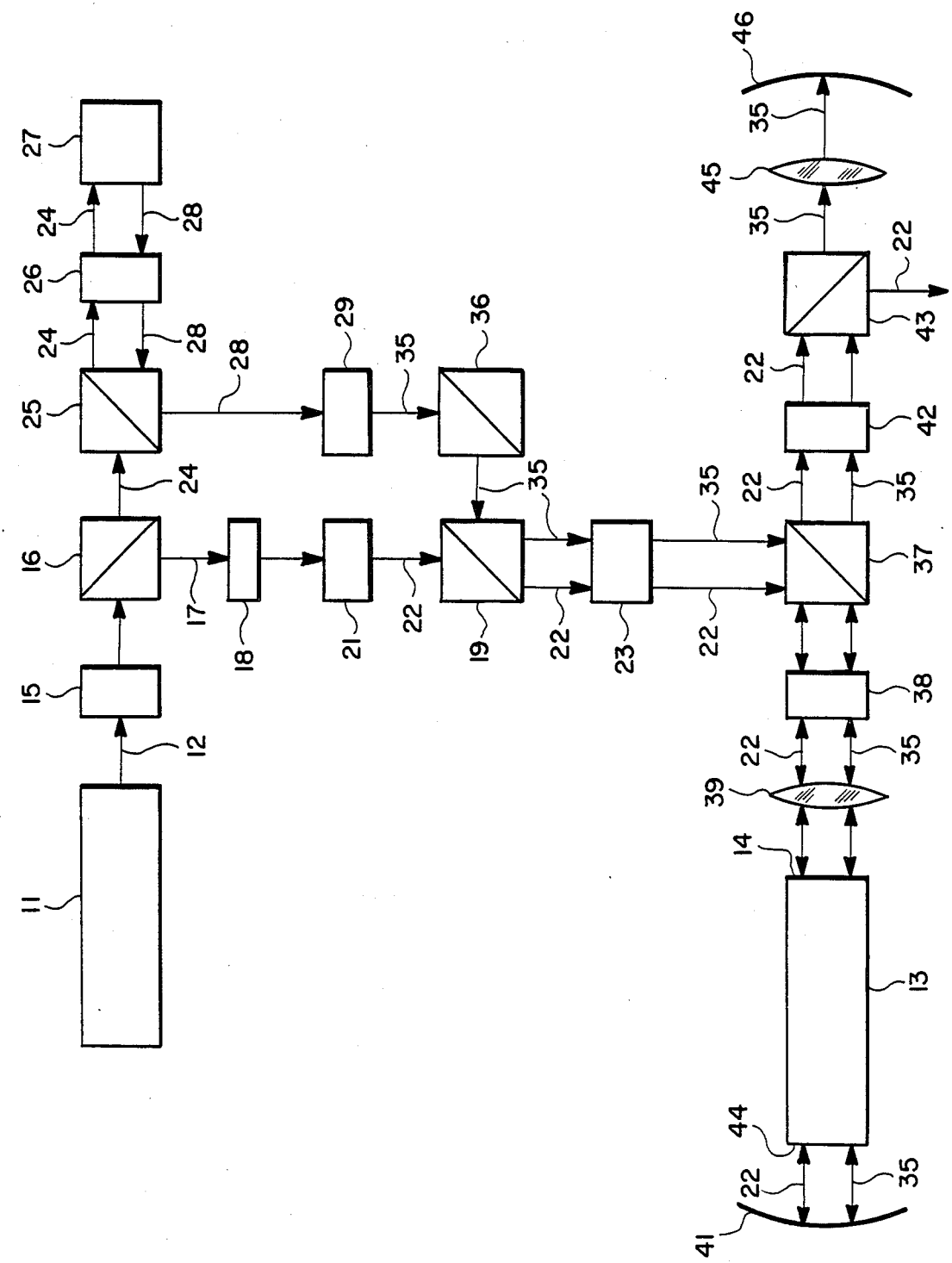

SIMULTANEOUS ALL-OPTICAL LOGICAL OPERATIONS USING THE THIRD ORDER NONLINEAR OPTICAL EFFECT AND A SINGLE WAVEGUIDE

BACKGROUND OF INVENTION

This invention relates generally to the laser art and more particularly to means for and a method of performing logical operations using two temporally and spatially modulated laser beams, with the result of the logical operation appearing as spatial and temporal modulation on one of the two laser beams. Such logical operations include the AND, OR, and NOT operations, as are performed by any electronic computer.

It is well known that two laser beams can interact with each other in a medium having a third-order nonlinear optical susceptibility. This interaction will occur if the frequencies of the two beams are separated by the so-called Stokes frequency shift which depends on the third order nonlinear optical susceptibility. This interaction may transfer energy and phase from a beam of one optical frequency to another beam of a second optical frequency, such as occurs with stimulated Brillouin or stimulated Raman scattering. The former laser beam is referred to as the pump laser beam, and the latter is referred to as the Stokes laser beam. For a further discussion of Brillouin scattering reference is made to the discussion of Brillouin scattering by B. Zeldovich et al, JETP Lett. 15, 109 (1972) and for a further discussion of Raman scattering reference is made to the discussion of Raman scattering by E. Garmire et al, Phys. Rev. Lett. 11, 160 (1963), both of which are incorporated herein as if set out at length.

It is well known that four-wave mixing is such an interaction, and that the four-wave mixing process has been used in both gases and photorefractive media to combine information. Four-wave mixing has been applied to matrix-vector multiplication and correlations. Such matrixvector calculations consist of multiplying and adding together two sets of numbers. For a further discussion of four-wave mixing see "Image Phase Compensation And Real-Time Holography By Four-Wave Mixing In Optical Fibers", by A. Yariv et al, Appl. Phys. Lett. 32, 635 (1978); for a further discussion of matrix-vector multiplication and correlation see "Optical Matrix-Vector Multiplication Through Four-Wave Mixing in Photorefractive Media", by P. Yeh et al, Opt. Lett. 12, 138 (1987). Previous work has used four-wave mixing in which the data located at separate spatial locations is combined separately and in parallel. See the aforementioned Yariv article as well as "Spatial Convolution And Correlation Of Optical Fields Via Degenerate Four-Wave Mixing", Opt. Lett. 3, 7 (1978). These approaches require significant power and have undesirable cross-talk between data at different points, i.e., between different spatial modes.

It is also well known that in an appropriate geometry and an appropriate medium the so-called 'mode' approximation holds. In this regime, different spatial frequencies of two beams transfer energy only. That is, under suitable conditions the phases of differing spatial modes are not transferred between each other, and the growth of a spatial mode is determined only by the pump and Stokes light in the same mode, the overall intensity, and the overall pump-Stokes correlation. This mode approximation is well known in interactions which start from noise at the Stokes frequency. Such interactions include the well-known non-linear optical phase conjugation effect. For a further discussion of the mode approximation see "Calculations of The Accuracy of Wavefront Reversal Utilizing Pump Radiation With One-Dimensional Transverse Modulation", by B. Ya. Zeldovich et al, Sov. J. Quant. Electron, 11, 186 (1981).

SUMMARY OF THE INVENTION

The above-noted mode approximation is equally applicable to geometries which start from a Stokes laser beam which is injected into a waveguide. Data bits may be represnted by spatial modes on the pump as well as the Stokes laser beam. These facts allow one to combine many bits of data simultaneously and in parallel in the same volume; data bits cooperate to transfer energy but do not suffer crosstalk. The cooperative process allows much less energy to be used for the logical operations. A further advantage of use of this principle is that the result of the logical operation is present on the Stokes laser beam and may be used as an input to another optical logical operation without conversion to an electronic signal.

It is an object of this invention to provide means for and a method of providing compact and simple apparatus for simultaneous logical combination of two data-carrying laser beams with predetermined temporal and spatial modulation, for example in a computer with any data processing application.

It is also an object of this invention to provide a nonlinear optical phase conjugation system which is particularly adaptable for use with computer processing.

It is another object of this invention to provide a new and improved method for performing digital operations such as an AND, OR, or NOT operation simultaneously and in parallel.

It is another object of this invention to provide means for and a method of logical combination of data, symbols and images.

It is another object of this invention to provide a method for producing an optical representation of the result of an optical logical operation which may be used as an input for subsequent optical processing without intervening electronics.

In accordance with these and other objects of the invention there is provided an apparatus wherein a first or pump laser beam is given predetermined first temporal and first spatial modulations representative of, for example, data bits and then focused into a waveguide containing a suitable third-order nonlinear medium with a known Stokes frequency shift. A second or Stokes laser beam, of optical frequency preferably equal to the pump frequency less the Stokes frequency shift, is given the first predetermined temporal modulation but a dissimilar spatial modulation. The second or Stokes laser beam, delayed with respect to the pump laser beam to effect counterpropagation in the waveguide, is also focused into the waveguide. The intensities of the beams are selected such that the spatial information on the two beams are combined on the second beam as the two beams counterpropagate through the nonlinear medium in the waveguide. The result of the logical operations may then be utilized for subsequent optical operations with the feature that no electronic conversions need be performed, and large arrays of data are combined accurately and simultaneously.

BRIEF DESCRIPTION OF THE DRAWING

The drawing shows a generalized block diagram of an optical logic gate phase conjugation system in accordance with the invention.

DETAILED DESCRIPTION OF THE INVENTION

Referring now the drawing there is shown by way of example a laser phase conjugation system in accordance with the invention that may provide optical computation with ditigal information, pictures, images, or the like.

A pulsed laser 11 utilizing a suitable laser medium such as, for example, KrF, dyes, Yittrium aluminum garnet, or any other suitable laser medium, generates a pulsed laser beam 12 of specified temporal bandwidth, preferably less than or equal to that of the temporal bandwidth of the nonlinear optical material contained in a waveguide 13 more fully discussed hereinafter. For example, if the waveguide is filled with sulfur hexaflouride at 30 atmospheres and the laser is a KrF laser, the bandwidth of the laser should not exceed about 500 MHz, more or less. The pulsed pumped laser beam 12 should have a pulsewidth of no less than about the inverse of the bandwidth of the nonlinear optical material and an interval between pulses of about at least twice the inverse of the bandwidth of the nonlinear optical material in waveguide 13; in the case of sulfur hexaflouride at 30 atmospheres and a KrF laser, a pulsewidth of 2 nanoseconds in 6 nanosecond intervals, more or less. Pulsed pumped laser beam 12 is preferably linearly polarized when generated in order to insure that the full strength of the nonlinear interaction will occur in the nonlinear material in the aforementioned waveguide 13. The intensity of pulsed pump laser beam 12 is such that the intensity of the pump laser 11 at the waveguide inlet 14 will give a Stokes intensity gain increment of at least about 0.5 over the length of waveguide 13; for sulfur hexaflouride at 30 atmospheres, a KrF laser and a waveguide length of 50 cm, this intensity is at least abut 0.33 MW/cm , at the waveguide entrance 14. The pump laser 11 should produce a laser beam 12 having a beam quality better than 2 times diffraction-limited to allow the laser beam to be transferred properly along its optical path. The pump laser beam 12 is then directed to and passed through a quarter-wave plate 15, or the like, to rotate the polarization of the pump laser beam 12 so that a desirable portion only of the pump beam 12 passes through a polarizing beam splitter 16. The pump laser beam 12 incident on splitter 16 is split by polarizing beam splitter 16.

One portion 17 of the split beam is then diverted in conventional manner to and through a neutral density filter and half-wave plate 18 or the like which determines the fraction of the pump beam which will pass through a subsequent polarizing beam splitter 19. Diverted portion 17 of the pump beam is then directed to and passes through a spatial light modulator 21 which imposes the desired data or information on the diverted portion 17 of the pump laser beam. The maximum practical frequency of spatial modulation is desirable so that the maximum number of bits, for example, may be encoded on a single pulse. For example this spatial modulation may be a pattern of bright and dark spots representing numbers. This maximum practical frequency is determined by the wavelength of the pump beam 12, the size of the imaging optics and the waveguide width. For example, for a KrF laser across an aperture of about 3 centimeters, and with a waveguide width of 0.1 centimeters, the corresponding minimum period of modulation is about 50 microns. The now spatially-modulated portion of the pump laser beam 22 is then directed to and passed through beam-splitter 19 which is oriented so that the majority of the modulated pump laser beam 22 passes directly through the beam splitter 19. The modulated pump laser beam 22 is then directed through a polarizer 23 which linearly polarizes the modulated pump laser beam 22 so that it has the same polarization of a Stokes beam dmore fully discussed hereinafter. For example, the polarizer 23 polarizes the modulated pump laser beam 22 and the Stokes beam incident thereon dat a polarization angle of 45 degrees from that of the modulated pump beam leaving beam splitter 19.

As shown in the drawing, a fraction 24 of the pump beam is used to generate the Stokes beam and this fractin 24 passes directly through the beam splitter 16. This fraction 24 of the pump laser beam then passes through a second beam splitter 25, a quarter-wave plate 26, and then into a conventional four-wave mixing cell 27. The well-known process of phase conjugation by the four-wave mixing cell 27 creates the Stokes beam 28 at the aforementioned Stokes optical frequency. This newly created Stokes beam 28 is directed back through the quarter-wave plate 26, and is diverted by the polarizing beam splitter 25 towards a spatial light modulator 29. Any other suitable means of diverting the Stokes beam to the spatial light modulator 29 may replace the polarizing beam splitter 25 and the quarter-wave plate 26. It is to be noted here that, alternately, the Stokes beam 28 may be separately generated without use of the aforementioned fraction 24 of the pump laser beam. The spatial light modulator 29 imposes the desired data or information on the Stokes beam 28. The maximum frequency of spatial modulation is the same as that of the pump beam for the same reasons: the corresponding minimum period of modulation may be about 50 microns in the same example. The spatially modulated Stokes beam 35 is now directed onto the path of the spatially modulated pump laser beam 22 using beam splitter 36 or a mirror, or the like, and the aforementioned polarizing beam splitter 19, or any other suitable means which will divert the Stokes beam 35 onto or coplanar with the optical path of the modulated pump beam 22. The modulated Stokes beam 35 then passes through the aforementioned polarizer 23 which polarizes the modulated Stokes beam 35 so that it has the same polarization of the modulated pump laser beam 22 passing therethrough. The general arrangement of the optics along the Stokes beam path is such that the modulated Stokes beam 35 is delayed so that the modulated pump and modulated Stokes laser beams will counter-propagate through waveguide 13 at about the same time. This delay should be as short as possible, and is basically determined by the length of the waveguide and the imaging technique used. For example, for a KrF laser, the sulfur hexaflouride nonlinear medium contained in a waveguide of width 0.1 centimeters, and a Stokes intensity gain increment of 1.5, the delay should be about 2 nanoseconds. Also, the intensity of the Stokes beam should be between 0.01 percent and 25 percent of the modulated pump beam 22 at the polarizer 23, so that energy may be transferred to the Stokes laser beam 35 from the pump laser beam 22 without excessive depletion of the energy of the pump laser beam, and yet the Stokes laser beam is large enough to be functional.

The two modulated laser beams are directed to and deflected by a polarizing beam splitter 37 to and through an electronic polarization rotator 38, to and then through a focusing lens 39, and finally into the waveguide 13. The importance of the polarization rotator 38 will be discussed later hereinafter. The waveguide 13 should have a width small enough to confine the two beams over at least one confocal parameter length of the focusing lens, small enough for multiple reflections to occur from the waveguide walls, and wide enough so that all the energy of the two beams is captured by the waveguide. The waveguide length should be long enough so that a Stokes intensity gain increment of at least about 0.5 occurs in the waveguide, and short enough so that it is less than the laser coherence length, and so that negligible depolarization occurs from the waveguide walls. In the present example, these dimensions may correspond to about 0.1 centimeters width and about 50 centimeters length. The modulated pump laser beam 22 passes through waveguide 13 first, and is retroreflected back through the waveguide by a suitable device 41 such as a retroreflector mirror, a four-wave mixing cell, or any similar means or method which reimages the beam back into the waveguide 13. The Stokes pulsed laser beam 35, delayed with respect to the pump laser beam 22 as discussed hereinabove, is present in the waveguide 13 containing a suitable third-order nonlinear medium such as, for example, sulfur hexaflouride, hexane, methane, hydrogen, lithium niobate, barium titanate or the like, at the same time as the retroreflected pulsed pump beam 22. The resulting nonlinear interaction of these two waves combines all the information on the pump beam 22 with all the information on the Stokes beam 35, simultaneously and in parallel, with the result of the logical operation being carried on the Stokes beam 35 as defined by well known 'mode' approximation equations. After the pulsed pump beam 22 has transferred its information to the pulsed Stokes beam 35, it is no longer of interest and may be removed from the system by any conventional means which does not result in interference with the Stokes beam 35. In the drawing, elimination of the pump reflected pulsed laser beam 22 is achieved by rotating the polarization of the pump beam by one-half wave using the polarization rotator 38, allowing the pump laser beam 22 to pass through the beam splitter 37, and then using a polarization rotator 42 and a polarizing beam splitter 43 to direct the pump beam 22 out of the system. Referring now to the Stokes beam 35, the Stokes beam 35 passes out of outlet end 44 of the waveguide 13 and is redirected by the aforementioned reflective device 41 back into and through the waveguide 13 and then through the focusing lens 39. The Stokes beam 35 will then pass through the now-activated polarization rotator 38 which rotates its polarization by a half wave. The Stokes beam 35 then passes directly through the polarizing beam splitter 37 by virtue of its polarization, and then through a focusing lens 45 and onto a viewer, retroreflector, four-wave mixing cell, or the like 46. At the viewer 46, which may consist of, for example, a photo-diode array, or a CCD array, the result of the logical operations which are encoded on the Stokes beam 35 may be converted to electronic signals or, alternately, may be retroflected, or phase-conjugated back towards the waveguide 13 for subsequent optical operations. The Stokes beam 35 may also be retroreflected and taken out of the system for further use, processing, or the like, via beam splitter 43 (not shown) in substantially the same manner as beam 22. If viewer 46 or the like has a suitable four-wave mixing cell as a component, then the Stokes beam 35 may be converted to a beam (not shown) at the pump frequency using well-known techniques and may then be combined in the same manner as described above, with a second, further delayed, input modulated Stokes beam (not shown) in a subsequent logical operation. This feature permits the operation, in accordance with the invention, to be entirely recursive.

The above mentioned second further delayed input modulated Stokes beam may be generated in any suitable manner. Thus, a further portion of pump beam 12 may be utilized in the same manner as the fraction 24 of the pump beam. Alternately, such second Stokes beam may be separately generated and then modulated and introduced into the system.

It is to be understood that the above-described embodiments of the invention are merely illustrative of the many possible specific embodiments which represent applications of the principles of the present invention. Numerous and varied other arrangements can readily be devised in accordance with these principles by those skilled in the art without departing from the spirit and scope of the invention.

What is claimed is:

1. Apparatus for performing an optical AND operation on two data carrying laser beams comprising:
   (a) first means for generating a pump laser beam pulse having a predetermined first spatial profile, first frequency, first temporal modulation and first intensity;
   (b) first modulating means for modulating said first spatial profile of said pump laser beam with second modulation representative of first data;
   (c) optical waveguide means comprising a third order optically nonlinear material having a predetermined bandwidth and a predetermined Stokes frequency shift;
   (d) first optical directing means for directing said first data encoded pump laser beam to and through said optical waveguide;
   (e) second means for generating a Stokes laser beam pulse having a second spatial profile, a second frequency at least substantially equal to said pump laser beam frequency less said Stokes frequency shift, second temporal modulation at least substantially equal to said first temporal modulation of said pump laser beam, and a second intensity;
   (f) second modulating means for modulating the said second spatial profile of said Stokes laser beam with third modulation representative of second data;
   (g) second optical directing means for directing said second data encoded Stokes laser beam to and through said waveguide substantially simultaneously with and in a direction opposite to the direction of travel of said first data encoded pump laser beam and said second data encoded Stokes laser beam travel substantially simultaneously through said waveguide in opposite directions;
   (h) laser beam utilization means; and
   (i) third optical directing means for directing said Stokes laser beam exiting from said waveguide to said utilization means.

2. Apparatus as defined in claim 1 wherein said pump laser generating means generates said pump laser beam with a bandwidth substantially equal to said nonlinear material bandwidth.

3. Apparatus as defined in claim 2 wherein said pump laser generating means generates said pump laser beam with a pulsewidth not substantially less than the inverse of said nonlinear material bandwidth.

4. Apparatus as defined in claim 3 wherein said pump laser generating means generates a series of pump laser beam pulses which are spaced in time one from another not substantially less than the inverse of said nonlinear material bandwidth.

5. Apparatus as defined in claim 4 wherein said second modulation is representative of digitized data.

6. Apparatus as defined in claim 1 wherein said means for generating said Stokes laser beam generates said Stokes laser beam with a bandwidth substantially equal to said nonlinear material bandwidth.

7. Apparatus as defined in claim 6 wherein said means for generating said Stokes laser beam generates said Stokes laser beam with a pulsewidth not substantially less than the inverse of said nonlinear material bandwidth.

8. Apparatus as defined in claim 1 wherein said waveguide means has a length less than the pulsewidth of said pump laser beam pulses.

9. Apparatus as defined in claim 8 wherein said waveguide means provides a gain of at least about 0.5.

10. Apparatus as defined in claim 9 wherein said means for generating said pump laser beam generates said pump laser beam with an intensity of at least about 0.33 megawatts per square centimeter at the entrance to said waveguide means.

11. Apparatus as defined in claim 10 wherein said first modulation means and said second modulation means encodes each said laser beam with up to five hundred thousand digitized data bits.

12. Apparatus as defined in claim 1 wherein said laser beam utilization apparatus produces electric signals.

13. Apparatus as defined in claim 1 wherein said utilization means comprises third optical modulation means.

14. Apparatus as defined in claim 1 wherein said third optical directing means includes means for receiving said Stokes laser beam from said waveguide means, phase-conjugating said Stokes laser beam and redirecting said phase conjugated Stokes laser beam to said waveguide means.

15. Apparatus as defined in claim 1 wherein said third optical directing means includes means for receiving said Stokes laser beam from said waveguide means, upshifting said Stokes laser beam to said pump laser beam frequency, and redirecting said upshifted Stokes laser beam to said waveguide means.

16. Apparatus as defined in claim 1 wherein said third optical directing means includes means for receiving said Stokes laser beam from said waveguide means, phase-conjuugating and upshifting said Stokes laser beam to said pump laser beam frequency and redirecting said phase conjugated and upshifted Stokes laser beam to said waveguide means.

17. Apparatus as defined in claim 1 wherein said apparatus performs optical AND operations simultaneously.

18. Apparatus as defined in claim 1 wherein said apparatus performs optical OR operations simultaneously.

19. Apparatus as defined in claim 1 wherein said apparatus performs optical NOT operations simultaneously.

* * * * *